(12) United States Patent
Conlee

(10) Patent No.: US 6,957,612 B2
(45) Date of Patent: Oct. 25, 2005

(54) RAISED LAP-FITTED WORK-TOP

(76) Inventor: Ralph B. Conlee, 11716 N. Williamsburg Dr., Knoxville, TN (US) 37922

( * ) Notice: Subject to any disclaimer, the term of this patent is extended or adjusted under 35 U.S.C. 154(b) by 0 days.

(21) Appl. No.: 10/457,414

(22) Filed: Jun. 10, 2003

(65) Prior Publication Data

US 2004/0250738 A1 Dec. 16, 2004

(51) Int. Cl.⁷ .............................................. A47B 23/00
(52) U.S. Cl. ........................................................ 108/43
(58) Field of Search ............................ 108/26, 25, 42, 108/43, 44; 248/918, 118, 444; 224/222

(56) References Cited

U.S. PATENT DOCUMENTS

| | | | |
|---|---|---|---|
| 4,052,944 A | | 10/1977 | Jennings |
| 4,235,472 A | * | 11/1980 | Sparks et al. ................ 297/392 |
| 4,700,634 A | | 10/1987 | Mills et al. |
| 5,081,936 A | * | 1/1992 | Drieling ....................... 108/43 |
| 5,090,334 A | * | 2/1992 | Sutton ......................... 108/43 |
| 5,127,339 A | * | 7/1992 | Hood, Jr. ..................... 108/43 |
| 5,143,341 A | | 9/1992 | Juster |
| 5,460,102 A | | 10/1995 | Pasmanick |
| 5,937,765 A | * | 8/1999 | Stirling ....................... 108/43 |
| 6,003,446 A | * | 12/1999 | Leibowitz .................... 108/43 |
| 6,173,656 B1 | * | 1/2001 | Blanchard .................... 108/43 |
| 6,187,398 B1 | * | 2/2001 | Eldridge .................... 428/35.2 |
| RE37,239 E | * | 6/2001 | Eisenberg .................... 108/43 |
| 6,529,369 B1 | * | 3/2003 | Zarek et al. ................ 361/680 |

* cited by examiner

Primary Examiner—Jose V. Chen

(57) ABSTRACT

A raised lap top work surface utilizes a concave area for comfortable use and positioning on a user's legs. V-shaped arching leg support surfaces provide reliable positioning of the raised lap top work surface on the user's lap. The raised lap top work surface has a raised working surface level located at the proper sight distance for reading or writing. A large cover gives the user a surface area large enough to display any reference material needed and still have ample room for writing.

4 Claims, 2 Drawing Sheets

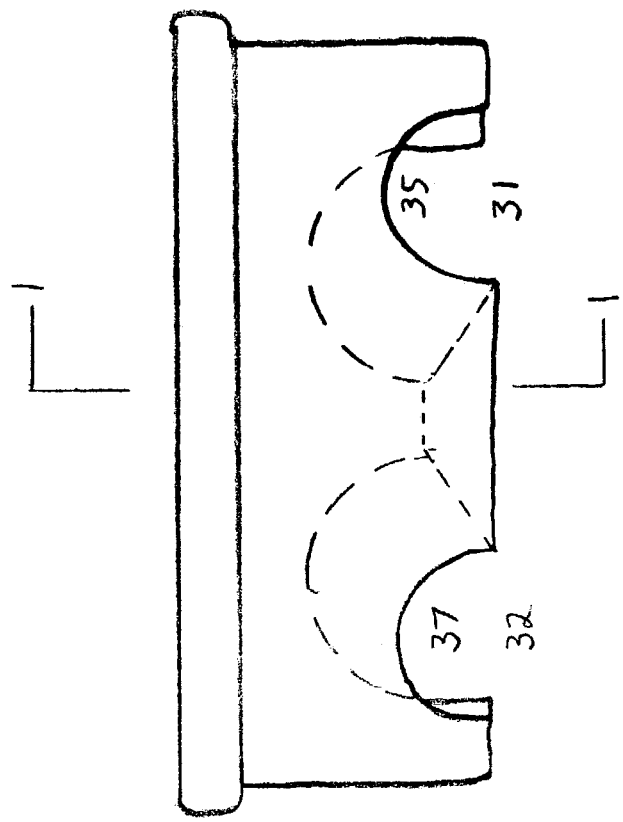
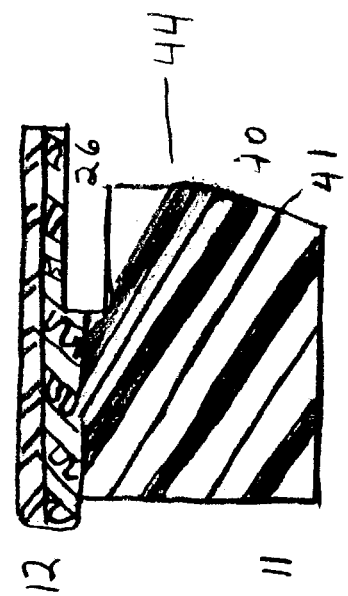
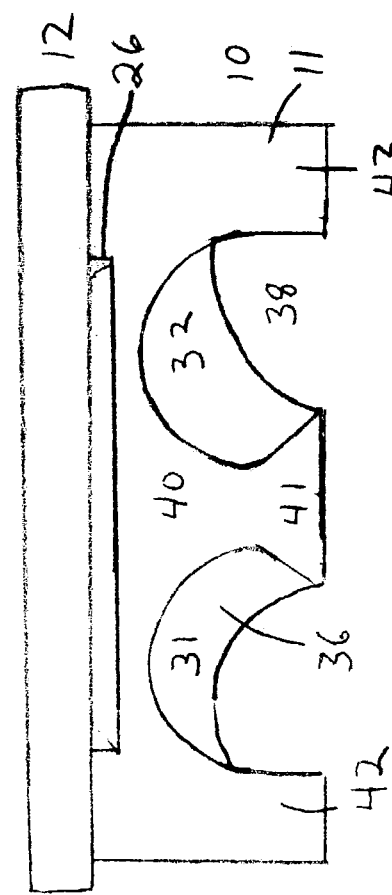

US 6,957,612 B2

RAISED LAP-FITTED WORK-TOP

RELATED APPLICATIONS

The present application is related to U.S. Provisional Application filed Jun. 17, 2002.

FIELD OF THE INVENTION

The present invention is in the field of portable lap desks adapted for doing close up work without having to bend over or to strain the eyes.

BACKGROUND OF THE INVENTION

Portable desks are well known and are used to supply a user with a writing or supporting surface in a place where no support is provided. A common area for using a portable desk is in a vehicle. During long trips a portable desk can be used to read a book or support a laptop computer. Children use portable desks in vehicles to color or prepare homework assignments.

There have been various patents which solve problems presented by portable desks which are currently on the market. Most portable desks are made of plastic but when not in use take up too much space. The plastic portable desks are also heavy making it difficult for a child or an elderly person to position and handle. Jennings U.S. Pat. No. 4,052,944 and Mills U.S. Pat. No. 4,700,634 disclose portable desks with cushion support for the user's legs.

A patent which has addressed some of these issues is that to Drieling U.S. Pat. No. 5,081,936. The Drieling patent discloses a compressible desk arrangement including a desk made of flexible foam with a rubber coating. The concept presented by Drieling is to provide a desk which may be collapsed by compressing the desk into a storage position. Unfortunately, the desk presented by Drieling is not practical because the desk is expensive to manufacture, and the supporting structure is not rigid enough to provide a solid support surface for writing or working.

There is a need for a portable desk which is lightweight, rigid and squares the user's legs for securing the desk. There is still another need to provide a portable desk having a hard surface but rests comfortably on the user's legs. Finally, there is a need for a portable desk having a raised working surface level at, or near, the proper sight distance for reading or writing; and at the same time, to provide a surface area large enough to display any reference material needed and still have ample room for writing.

SUMMARY OF THE INVENTION

The present invention is directed to a raised lap fitted work top which provides a user with a work-top suitable for doing close-up work without having to bend over, or to strain the eyes.

Another object of the present invention is to provide a portable desk made rigid with light weight cellular polystyrene.

Another object of the present invention is to provide a portable desk having a raised working surface level at, or near, the proper sight distance for reading or writing; and at the same time, to provide a surface area large enough to display any reference material needed and still have ample room for writing.

The present invention makes use of the leg tops for support as does similar patented items, but unlike other patented lap oriented tops, the unit is designed to fit the top of the legs when the legs are slightly spread. This spreading of the legs provides a larger supporting area for the unit, and allows the unit to be made larger without fear of the top from becoming unbalanced, causing the unit to tip to one side. The V-shape of the spread legs, also, resists any forward movement of the unit resting on the legs.

DETAILED DESCRIPTION OF THE DRAWINGS

FIG. 2 is a front perspective view of the raised lap-fitted work-top device of the present invention.

FIG. 3 is a rear view of the raised lap-fitted work-top device of the present invention.

FIG. 4 is a side cross sectional view taken along lines 1—1 of FIG. 2 illustrating the raised lap-fitted work-top device of the present invention.

DESCRIPTION OF THE PREFERRED EMBODIMENTS

The present invention is directed to a raised lap fitted work top. The raised lap fitted work top or portable desk is described in FIGS. 1–4. Although the Figures illustrate the desk having sharp edges and corners the edges and corners may be round or chamfered to prevent pinching. The portable desk of the present invention will now be described in detail.

Figure 1:
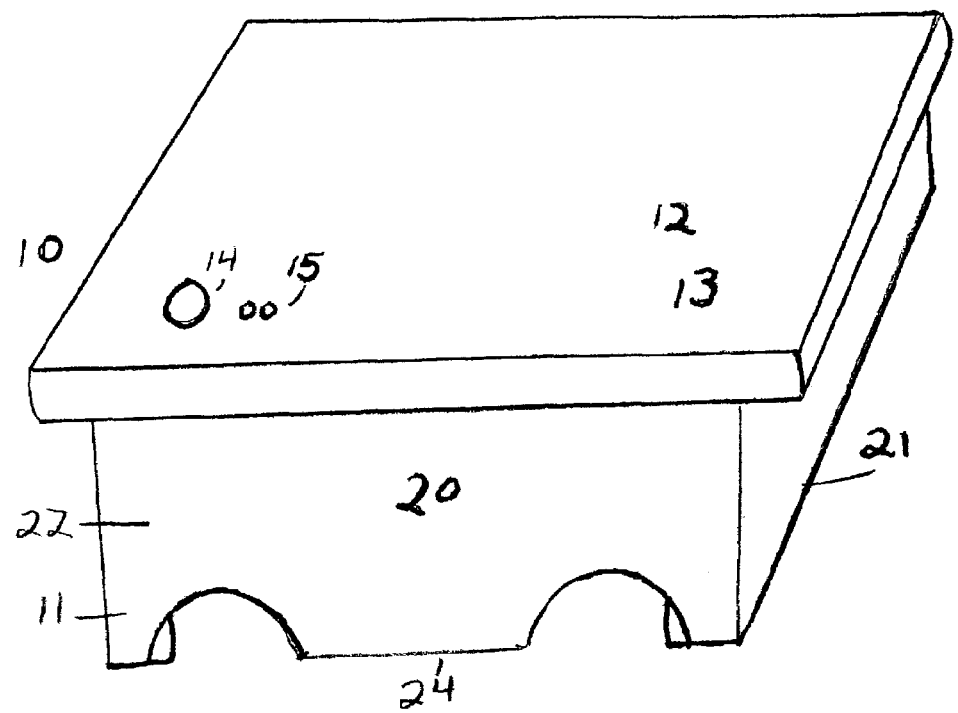
FIG. 1 is a perspective view of a raised lap-fitted work-top device according to one embodiment of the present invention.
Figure 5:
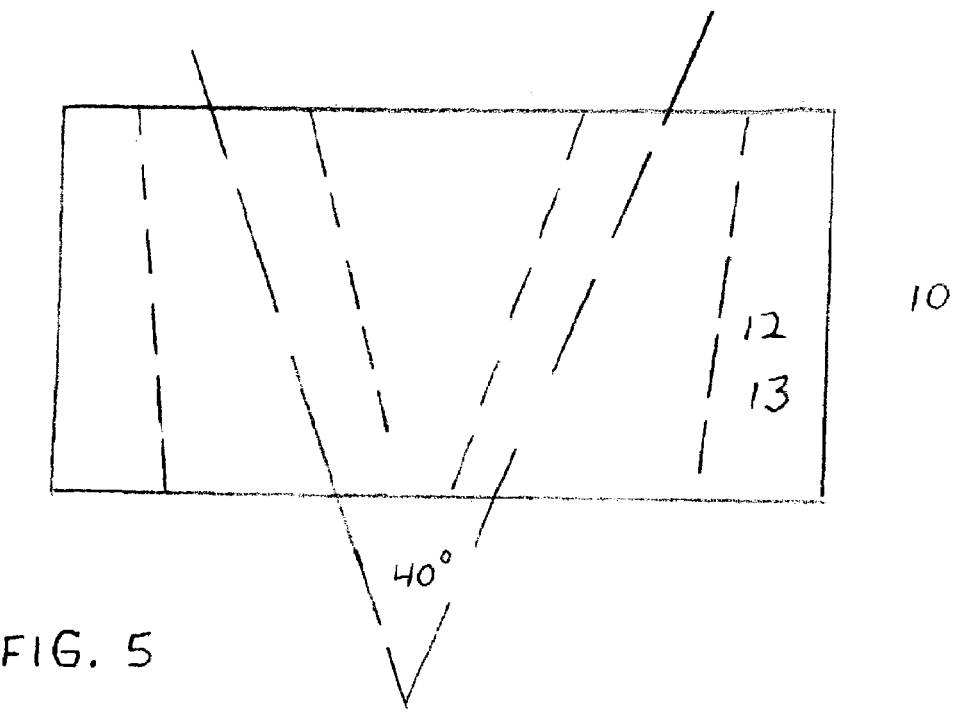
FIG. 5 is a top view with broken lines illustrating the positioning angle of the legs of the user.

FIG. 1 discloses a portable lap desk 10 having a main body portion 11 and a cover 12. The cover 12 is made of laminated cardboard or plastic to provide a hard outer surface 13. As illustrated in FIG. 1, the cover is provided with a container holder 14 and a plurality of pencil holders 15. There may be more than one container holder 14 or more than two pencil holders 15 formed in the cover 12 and in the lower body portion 11. The container holder is a circular depression about 3 inches wide in diameter and 4 inches deep.

The lower body portion 11 is made from lightweight polystyrene or Styrafoam and is cut into shape or may be molded to the shape illustrated in FIGS. 1–4. The lower body portion 11 has a front wall 20, side walls 21, 22, a rear wall 23 and a bottom portion 24. The rear wall 23 is concave in shape to conform to the user's waist area. Illustrated in FIG. 3 is a shelf 26 which is integrally formed in the lower body portion. The shelf may be used to hold newspapers, books, small craft items and papers for future use. The shelf provides the use of the lap top as a side bin when turned so that the shelf is facing upward.

As illustrated in FIGS. 2–4, the main body portion 11 has means 30 for positioning a user's legs to support the portable lap desk 10. The means 30 is formed in the bottom portion 24 and includes arching supporting surfaces 31, 32 which rise in height relative to the plane of the bottom wall to compensate for the natural slope of the legs in a sitting position. Arching supporting surfaces 31, 32 extend from the rear wall 23 to the front wall 20. Each arching supporting surface 31, 32 also narrows in width from the rear wall 23 to the front wall 20. Arching supporting surface 31 extends to the front wall 20 at an angle of approximately 135 degrees relative to the plane of the rear wall and at an angle of 135–160 degrees relative to the plane of the bottom wall.

Arching supporting surface 32 extends to the front wall 20 at an angle of 45 degrees relative to the plane of the rear wall 23. The arching supporting surfaces rest on the user's legs and provide means for spreading the user's legs at an angle of approximately 40 degrees relative to each other. Anywhere from 35–55 degrees to form a V-shaped angle provides enough support for the user. The angles may range from 125–145 degrees for arch support surface 31 and 35–55 for arch support surface 32. The V-shape of the spread legs resists any forward movement of the portable lap desk 10 resting on the legs.

Arching supporting surface 31 extends into an opening 35 in the front wall 20 and extends into an opening 36 in the rear wall 23. Arching supporting surface 32 extends into an opening 37 in the front wall and into an opening 38 in the rear wall 23. The openings in the rear wall 36, 38 are larger than the openings 35, 37 in the front wall 20. The concept of utilizing the lap desk to spread the user's legs provides a larger supporting area for the lap desk 10, and allows the lap desk 10 to be made larger without fear of the top from becoming unbalanced, causing the lap desk 10 to tip to one side.

Formed between the supporting surfaces 31, 32 is a dividing member 40. The dividing member has a rear portion 41 which extends at an angle toward the user but not as far down as the bottom portion 24. The rear portion 41 of the dividing member assists the user in positioning the lap desk 10 on the thighs of the user by limiting the extension of the rear portion 41. The rear wall 23 is further provided with feet 41, 42 which also assist the user in positioning the desk on the user's thighs. The broken lines in FIG. 2 illustrate the shape of the arches 31, 32 as they pass through the raised lap fitted work top 10.

FIG. 4 illustrates a side cross sectional view taken along lines 1—1 of FIG. 2. Concave area 44 provides a comfortable positioning and support surface for handicapped or elderly individuals. The concave area 44 rests against the user's waistline and because of the concave shape the user is not gouged by the lower body portion 11. FIG. 4 also illustrates the lightweight cellular polystyrene material used to make the main body portion 11 and the laminated cardboard or plastic material used to make the cover 12.

The dimensions of the raised lap fitted work top are an important part of the concept. The front end of the cover 12 is made to rest about 7 inches above the knees of the user. The back end of the cover is made to rest about 4 inches above the thighs. The 3 inch differential compensates for the natural slope along the legs from the thighs to the knees, and provides some extra rise so as to cause the cover to tilt slightly toward the user.

The lap desk structure provides an easy to lift supporting surface especially designed for elderly or handicapped individuals. The lap desk may also be used as a side table or a side bin or in any situation where a small supporting surface is needed. For use while sitting down, the raised lap fitted work top provides a user with a work-top suitable for doing close-up work without having to bend over, or strain the eyes.

What is claimed is:

1. A portable lap desk, said portable lap desk said portable lap desk comprising,
    a cover and a main body portion, said cover removeably attached to said main body portion, said main body portion having a front wall, a rear wall, side walls and a bottom portion and a bottom wall,
    a first arching supporting surface, and a second arching support surface, each arching support surface integrally formed in said bottom portion for resting said portable lap top desk on a user's legs, each arching support surface extending from said front wall to said rear wall at an angle of 45 degrees relative to the plane of said bottom wall, said arching supporting surfaces rising in height relative to the plane of said bottom wall to compensate for the natural slope of the legs in a sitting position, each arching supporting surface narrowing in width from said rear wall to said front wall, each arching supporting surface extending to said front wall at an angle of approximately 135 degrees relative to the plane of said rear wall and at an angle of 135–160 degrees relative to the plane of said bottom wall, and
    a dividing member integrally formed between said arching support surfaces, said dividing member having a rear portion which extends downwardly and forwardly towards said front wall for positioning the user's thighs in said main body portion, said dividing member having feet formed in said rear wall for positioning said lap desk on the user's thighs and preventing said lap desk from extending onto the user's lap, said arching supporting surfaces and said dividing member providing a contoured supporting surface for positioning said lap desk on said user's legs and thighs to prevent said lap desk from tipping over during use.

2. The portable lap desk as recited in claim 1, said portable lap desk comprising a shelf.

3. The portable lap desk as recited in claim 1, said portable lap desk comprising a plurality of pencil holders.

4. The portable lap desk as recited in claim 1, said portable lap desk comprising a container holder.

\* \* \* \* \*